Inventor:
Harold W. Lord,
by Harry E. Dunham
His Attorney.

Patented Aug. 19, 1941

2,253,184

UNITED STATES PATENT OFFICE 2,253,184

ELECTRIC DISCHARGE APPARATUS

Harold W. Lord, Schenectady, N. Y., assignor to General Electric Company, a corporation of New York Application August 31, 1940, Serial No. 355,044

4 Claims. (Cl. 176—124)

My invention relates to apparatus for effecting the starting of an electric discharge device, such as an electric discharge lamp, which is provided with electrodes one or more of which are adapted to be heated before the discharge in the device is started. It is the object of my invention to provide improved apparatus of this character by which the application of the starting voltage is delayed until the temperature of the heated electrode or electrodes has reached the desired point.

My invention will be better understood from the following description taken in connection with the accompanying drawing, and its scope will be pointed out in the appended claims.

Figure 1:
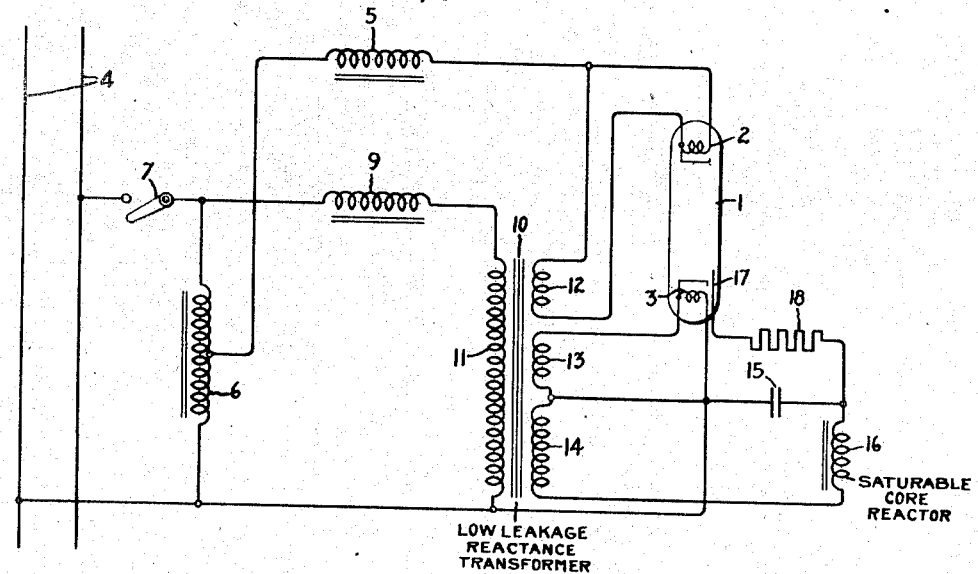
Figure 2:
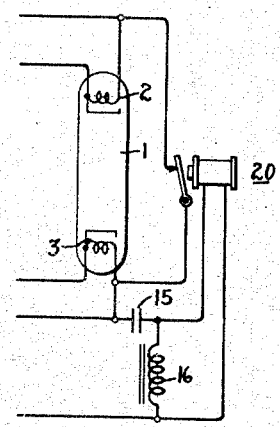

Referring to the drawing, Fig. 1 is a circuit diagram illustrating one embodiment of my invention and Fig. 2 shows a modification.

In Fig. 1 of the drawing, 1 is a gaseous electric discharge device which for example may be a sodium lamp of well known construction. The electrodes 2 and 3 of the device are shown as filamentary in form, which electrodes, to preserve their life, should be heated to an electron emitting temperatures before the discharge is started in the device as is well known to those skilled in the art. The device during its normal operation is supplied with alternating current from the source 4, which may be a 220 volt, 60 cycle lighting circuit, through the ballast reactor 5, the autotransformer 6 and the switch 7. For initially heating the electrodes and for a further purpose to be described later I have provided the reactor 9 and the low leakage reactance transformer 10 of which the primary 11 is connected in series with the reactor 9 to be supplied from the source 4. The transformer 10 has the three secondary windings 12, 13, and 14, windings 12 and 13 being connected to supply heating current respectively to the electrodes 2 and 3. Connected in a series circuit across the winding 14 are the capacitor 15 and the saturable core reactor 16 which when saturated causes the circuit including it and the capacitor to go into resonance. I make use of the increase in voltage across the capacitor resulting from a saturation of the reactor to start the discharge in the device, by providing the device with the starting electrode or probe 17 which I connect through the resistor 18 with one side of the capacitor, the adjacent electrode 3 of the device being connected with the other side thereof.

By arranging the reactor 9 in series with the transformer primary the reactor exercises a controlling effect upon the transformer such that the current supplied to the primary thereof is approximately constant notwithstanding small changes in the secondary load. Since, then, the current input to the transformer is approximately constant, variations in resistance of the load circuits fed by windings 12 and 13 must produce variations in voltage across the transformer windings as is usual with constant current transformers.

When the apparatus is thrown on the supply circuit by closing the switch 7, the voltage applied to the electrodes is too low to cause a discharge to start in the device; however, the electrodes are immediately supplied with heating current from the secondary windings 12 and 13. The voltage at first applied to the reactor 16 is insufficient to cause saturation thereof; hence, the circuit including it and the capacitor does not go into resonance. As the temperature of the electrodes increases, the consequent increase in their resistance causes an increase in the voltage across the winding 14 as well as the other windings. When the temperature of the electrodes has reached the point of electron emission the voltage of the winding 14 has become sufficient to cause saturation in the reactor 16 and by the reactor becoming saturated the inductive reactance in the circuit reduces to a value which will resonate with the capacitance therein. The resulting higher voltage across the capacitor applied between the probe 17 and the adjacent electrode 3 produces a discharge therebetween which by ionizing the gas in the device causes the discharge to start between the electrodes 2 and 3. Under certain conditions the electrode 3 only may be filamentary and be initially heated, in which case I may dispense with the secondary winding 12.

Instead of employing the reactor 9 in series with the low leakage reactance transformer 10 to obtain the effect of a transformer having high leakage reactance I may in certain cases prefer to employ simply a high leakage reactance transformer of some well known form having windings corresponding to those of the transformer 10. Although such a transformer has high leakage between its primary and the secondary, the several windings constituting the secondary should of course be closely coupled with each other.

In the modified form of my invention illustrated by Fig. 2, I have dispensed with the starting electrode or probe and start the device by opening a short circuit across it by means of the relay 20 controlled by the resonant circuit. The back contact and the armature of the relay connect each with one of the electrodes 2, 3 and the winding is connected across the reactor 16 to be responsive to the voltage thereof. When the electrodes become sufficiently heated and the circuit of the capacitor 15 and reactor 16 goes into resonance the relay opens the short circuit across the device causing it to start in the well understood manner.

I have chosen the particular embodiment described above as illustrative of my invention and it will be apparent that various modifications may be made without departing from the spirit and scope of my invention which modifications I aim to cover by the appended claims.

What I claim as new and desire to secure by Letters Patent of the United States, is:

1. In combination, an electric discharge device having spaced electrodes arranged to be connected with a source of alternating current supply, means for initially heating one of said electrodes by passing current therethrough and means including a non-linear resonant circuit responsive to a predetermined change in the resistance of said one electrode as it becomes heated for applying a starting voltage to said device.

2. In combination, an electric discharge device having spaced electrodes arranged to be connected with a source of alternating current supply and having a starting electrode, a transformer having a plurality of secondary windings, one of said windings being connected to supply heating current to one of said electrodes, a non-linear resonant circuit connected to be supplied by another of said windings and means connecting said one electrode and said starting electrode across a reactive element of said circuit.

3. In combination, an electric discharge device having spaced filamentary electrodes and a probe, means for connecting said device with a source of supply of alternating current, a reactor, a transformer having its primary connected in series therewith to be supplied from said source, said transformer having a plurality of secondary windings, one of said windings being connected to supply heating current to each of said electrodes, a resonant circuit connected to be supplied by another of said secondary windings and including a capacitor and a saturable core reactor and means connecting said probe and one of said electrodes across said capacitor.

4. In combination, an electric discharge lamp provided with filamentary eletrodes and arranged to be connected with a source of alternating current supply, a transformer having its primary arranged to be connected with said source and having a plurality of secondary parts, certain of said parts being connected to supply heating current to said electodes, means in said primary connection for regulating the primary current to an approximately constant value notwithstanding changes in the secondary load, and means responsive to the increased voltage in another of said secondary parts as said electrodes become heated for causing said lamp to start.

HAROLD W. LORD.